Aug. 1, 1950 L. R. DABBS ET AL 2,517,288
ROLLING TRACTOR SUPPORTED COTTON CHOPPER
Filed Jan. 10, 1947 2 Sheets-Sheet 1

INVENTORS
Lucian R. Dabbs
Lawrence R. Palmer
BY Lancaster, Allwine Rommel
ATTORNEYS.

Aug. 1, 1950 L. R. DABBS ET AL 2,517,288
ROLLING TRACTOR SUPPORTED COTTON CHOPPER
Filed Jan. 10, 1947 2 Sheets-Sheet 2
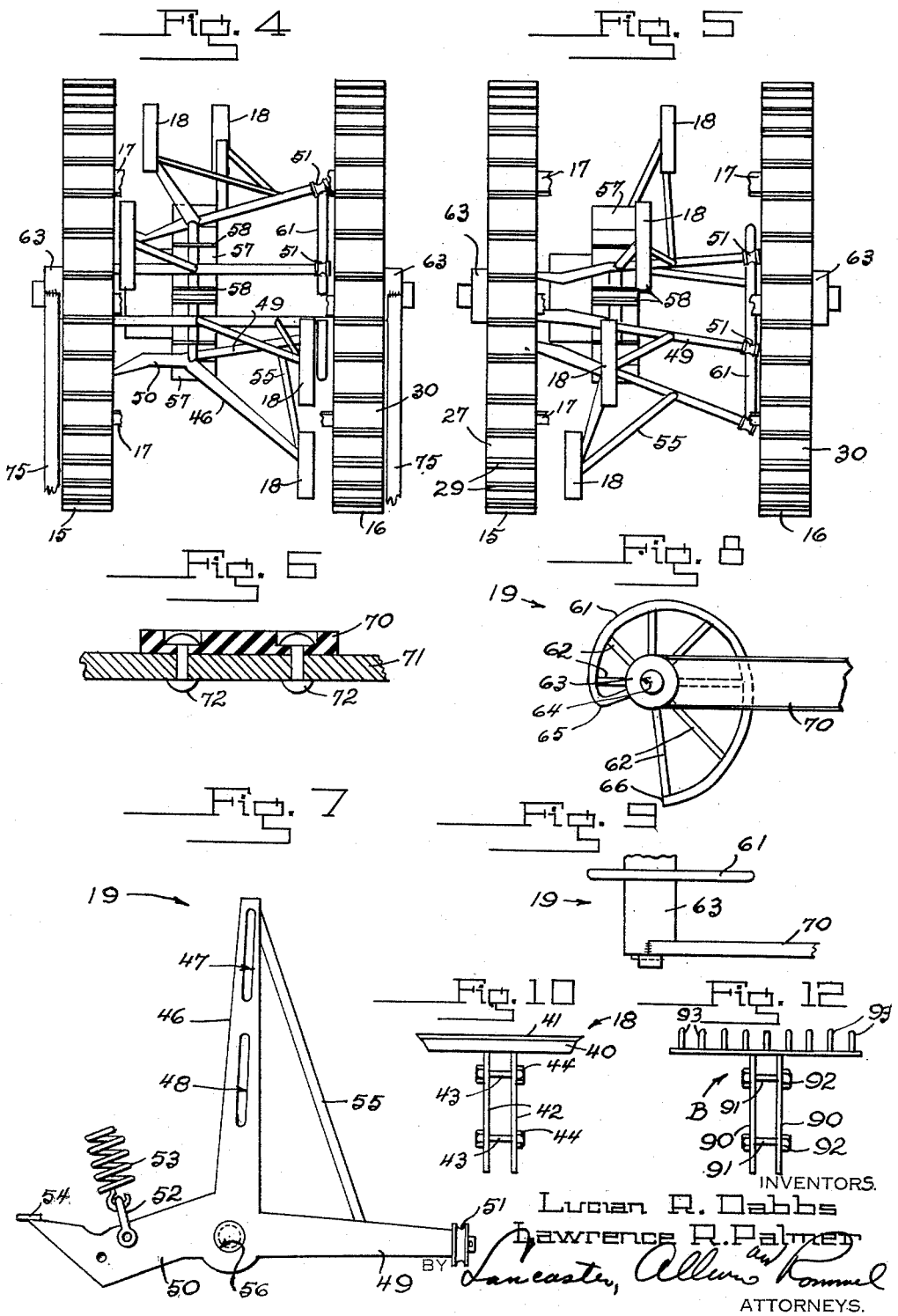
INVENTORS.
Lucian R. Dabbs
Lawrence R. Palmer
BY Lancaster, Allen & Rommel
ATTORNEYS.

Patented Aug. 1, 1950

2,517,288

UNITED STATES PATENT OFFICE 2,517,288

ROLLING TRACTOR SUPPORTED COTTON CHOPPER

Lucian Riley Dabbs, Quincy, and Lawrence Ray Palmer, Amory, Miss.

Application January 10, 1947, Serial No. 721,318

2 Claims. (Cl. 97—22)

This invention relates to agricultural machinery and more particularly to such machinery provided to block out and weed rows of plants. An example of such a machine is a cotton chopper and weeder.

The invention herein disclosed is an improvement over some of the features of the cotton chopper disclosed in our co-pending application Serial No. 665,101, filed April 26, 1946, now United States patent No. 2,504,004, issued April 11, 1950.

An important object of the invention is to provide a wheeled machine adapted to be hitched to a vehicle, such as a tractor, for the purpose of either accurately blocking out rows of plants, such as cotton, or weeding between the cotton plants.

Another important object is to provide a wheeled machine which will leave standing evenly-spaced apart plants disposed in rows and not damage them although the machine rolls along the rows and depends upon reciprocating knives for the removal of undesired plants.

Still another important object is to provide a machine, employing reciprocating knives or weeders, which will not tend to simply partly cut or tear the plants and weeds to be removed, but will remove the plant or weed in a clean manner.

Other objects and advantages of the invention will be apparent during the course of the following detailed description of the invention, taken in connection with the accompanying drawings, forming a part of this application, and in which drawings:

Figure 4 is a bottom plan of the machine.

Figure 5 is a forward or front elevation thereof.

Figure 6 is an enlarged, fragmentary section through an abutment means forming a part of the operating structure.

Figure 7 is an elevation of a rocker arm portion of the operating structure.

Figure 8 is an elevation of a cam track also forming a part of the operating structure and Figure 9 is a fragmentary plan thereof.

Figure 10 is an elevation of one of the knives which may be employed with the improved machine.

Figure 12 is an elevation of one of the weeders which may be employed with the improved machine.

Figure 1:
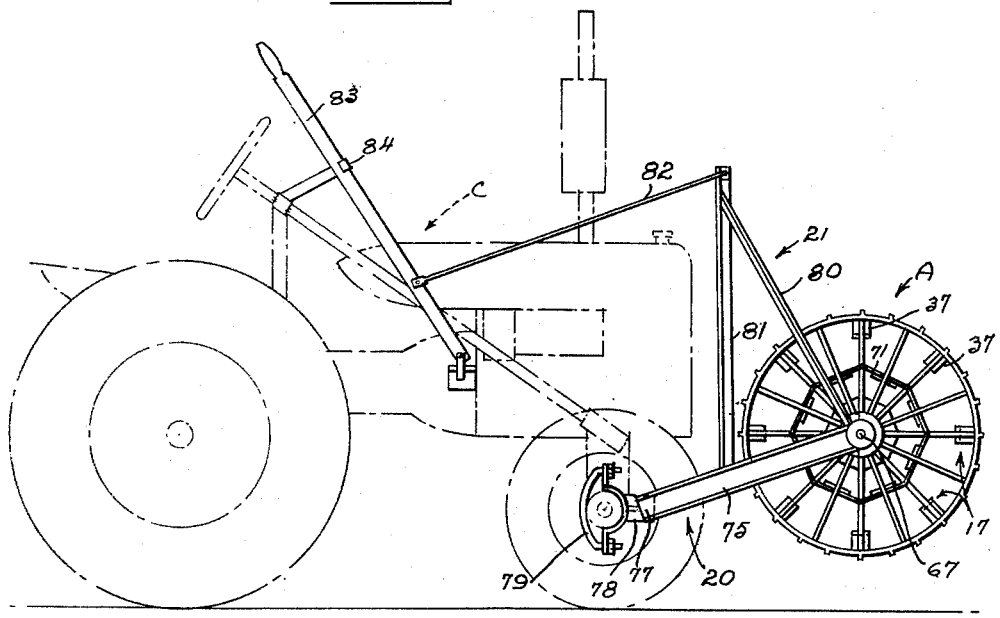
Figure 1 is a side elevation of the improved machine hitched to a vehicle, with the machine in a raised position.

In the drawings, wherein for the purpose of illustration is shown a preferred embodiment of the invention and wherein similar reference characters designate corresponding parts throughout the several views, the letter A designates the improved machine, the letter B a weeder attachment therefor, and C a vehicle to which the machine A may be attached.

The machine A includes, preferably, a pair of spaced-apart ground wheels 15 and 16 with their axes of rotation substantially coincident; means 17 connecting the wheels 15 and 16; a plurality of chopping knives 18 operatively carried by the wheel 15; means 19 to actuate the knives 18; guide means 20 to couple the chopper A to a suitable means of propulsion therefor, as the vehicle C, for guiding the chopper A; and means 21 to raise and lower the chopper A.

Figure 2:
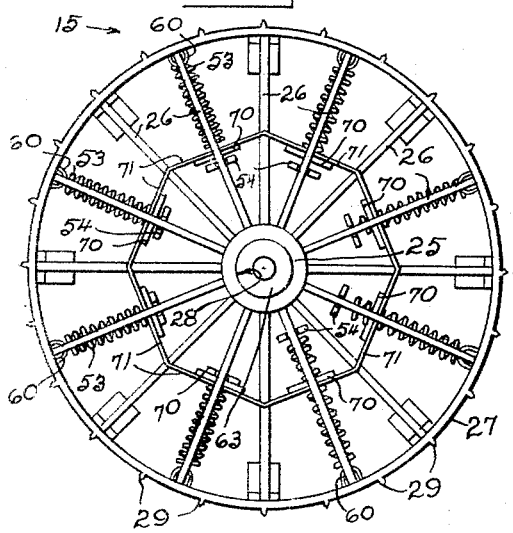
Figure 2 is an elevation of one ground wheel forming a part of the improved machine, with portions of the operating structure in elevation.

Referring mainly to Figure 2, it will be seen that the ground wheel 15 has a hub portion 25, spokes 26 radiating therefrom, and a rim portion 27 to which the outer ends of the spokes are connected in staggered relation, so that each alternate spoke end is adjacent one edge portion of the rim and the other spoke ends are adjacent the other edge portion thereof. The hub portion has a bore 28 and, extending outwardly from the rim portion 27, may be a plurality of spaced-apart, conventional calks 29.

Figure 3:
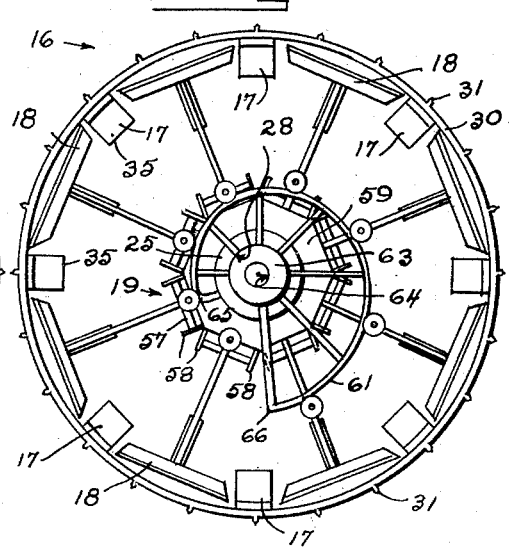
Figure 3 is an elevation of another ground wheel forming a part of the machine, with other portions of the operating structure in elevation.

The ground wheel 16, shown more particularly in Figure 3, has a rim portion 30 provided with a plurality of spaced-apart, conventional calks 31.

Figure 11:
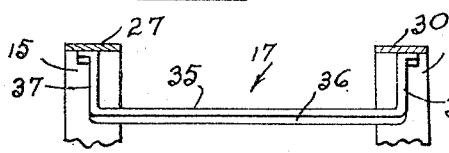
Figure 11 is a perspective view of a connecting means between the wheels of Figures 2 and 3.

For connecting the wheels 15 and 16, we provide a means 17 which comprises a plurality of spaced-apart members 35, one of which is shown in Figure 11 and which comprises a bridging portion 36 and arm portions 37 with the latter forming substantially right angles with the bridge portion. The free ends of the arm portions are secured to the under sides of the rim portions 27 and 30; thus rigidly securing the wheels 15 and 16 together in spaced relation with the bridging portions inwardly of the peripheries of the rims.

All of the knives 18 are preferably alike and, as may be seen particularly in Figure 10, include an elongated blade 40 having a cutting edge 41 along one longitudinal edge. Each knife 18 has means to secure it to the means 19 to actuate the knives. This may be a pair of substantially parallel, spaced-apart straps 42 extending from one face of the blade 40 and provided with suitable axially-aligned openings accommodating the shank portions of bolts 43 having nuts 44, so that these shanks may also extend through portions 46 of the means 19 to actuate the knives, next to be described.

The means 19 to actuate the knives 18 includes a plurality of knife carriers or rocker arms 45, there being one for each knife, and one is shown in Figure 7. Each carrier is somewhat T-shaped in elevation, having an elongated central arm portion 46 provided with a slot 47 adjacent its free end, and a second slot 48 intermediate its ends. This arm portion 46 joins a portion comprising a roller-carrying arm portion 49, forming substantially a right angle with the arm portion 46, and a resilient means and stop means-carrying section 50, extending from the arm portion 46 in a direction away from the section 49.

The slots 47 and 48 slidably accommodate the shank portions of the bolts 43 but by tightening the nuts upon the shanks so that the heads of the bolts and the nuts 44 bear tightly against the outer faces of the straps 42, forcing the straps into good frictional contact with the arm portions 46, the knives 18 are secured to the arm portions 46. The slots, of course, provide for adjustment of the straps longitudinally of the arm portions, as is obvious.

Each roller-carrying arm section 49 is provided, at its free end, with a suitable pivot for a roller 51, preferably a grooved roller, with its axis of rotation normal to the transverse axis of the section 49. These rollers 51 roll over the surface of a cam track 61 to be subsequently described.

Intermediate the ends of each of the other sections 50 is a pivoted eye member 52, constructed and arranged to receive one end of a retraction coil spring 53 and the outer end of the section 51 is provided with a stop block-engaging member 54 for association with a portion 70 of the means 19 subsequently described.

If desired, the sections 49 and arm portions 46 may be braced, as by braces 55 extending diagonally from one to the other.

At the juncture of each arm portion 46 and its associated sections 49 and 50, is a perforation 56 for one of a plurality of pivotal connections 57, shown in Figure 3, and which connections are secured to lugs 58 extending outwardly from the surface of a second hub 59, rigidly secured to the periphery of the hub 25 so that the carriers 45 may rock on the pivots provided.

The opposite ends of the retraction coil springs 53 are secured to spaced-apart eyed members 60 extending toward the axis of rotation of the wheel 15 and secured to the inner side of the rim 27 thereof.

Forming part of the means 19 is also an arcuate cam track 61, shown particularly in Figures 3, 8 and 9, over which the rollers 51 rotate with the rotation of the ground wheels 15 and 16. The cam track 61 may be a length of rigid rod stock, formed into a spiral, and supported by spokes 62 extending outwardly from a hub-like portion 63 having a bore 64. The diameter of the portion 63 is such that it fits snugly within the bore 28 of the hub portion 25 but so that the hub portion 25 may rotate freely on the periphery of the portion 63, which does not rotate. The construction of the cam track 61 is such that, of course, it has two ends 65 and 66. One end 65 is nearer the center of the hub-like portion 63 than is the end 66. Extending through the bore 64 is a shaft 67.

The final portion of the means 19 comprises a plurality of spaced-apart stop blocks or abutments 70, one being shown in Figure 6, which may be rubber, and each secured to the inner face of a support 71 as by rivets 72, as in Figure 6. There are as many supports 71 and stop blocks 70 as there are stop block-engaging members 54, as may be appreciated from Figure 2, since the latter are constructed and arranged to contact the stop blocks 70 upon rocking of the carriers 45.

From the foregoing, it will be seen that the means 19 operates to alternately sweep each knife quickly across the chopper A from rim to rim and then sweep each knife more slowly in the opposite direction, since the rollers 51 follow the cam track 61 then roll off it at its ends 66 (at which time, as it may be apparent, the retraction coil spring, connected to the knife carrier 45 rotatably supporting the roller running off the track, is most elongated) thus permitting the specific elongated retraction coil spring 53 mentioned to shorten and rock this specific knife carrier so that the knife connected therewith will sweep as stated. In order that each sweep will occur as the knife so actuated will reciprocate when it is at its lowermost position, the cam track 61 must be properly positioned to cause this action to take place. As the wheel 15 continues to rotate, the rollers 51 of the knife carriers 45 which have left the cam track will again approach the latter and pass over the end 65 of the latter so that, as they roll thereover, the retraction springs 53 will be gradually re-elongated, as is now apparent, and the knives drawn to positions to again quickly sweep across the machine A. As they so sweep, the plants in their path will be cut down, but those outside their sweeps will not be removed.

Upon comparing Figure 2 with Figure 3 it will be seen that the supports 70 for the stop blocks are disposed substantially the same distance from the axis of rotation of the ground wheel 15 as is the end 65 of the cam track 66 and that the positions of the stop blocks 70 are such that the rollers 51 cannot move to positions so that they will not mount the cam track at 65.

By placing the means 17 of Figure 11 as it is placed, it does not interfere at all with the standing plants, nor does the gradual movement of the knives in the opposite direction, after their quick sweep, interfere at all with the standing plants.

The guide means 20 to couple the chopper to a suitable vehicle for guiding the ground wheels 15 and 16, is shown mostly in Figures 1 and 4, and may be a pair of elongated members 75, as of channel iron, fixedly secured, one at each end of the hub-like portion 30. These members 75 are pivotally secured, at their rearward ends 77 to a bracket 78 extending from a conventional double U-coupling 79 shown in Figure 1, for fixedly securing the bracket 78 to the vehicle C.

So that chopper A may be raised and lowered, the means 21 may be provided, and comprises a conventional yoke 80 secured to the machine A, as to the outer ends of the members 75, and extending upwardly to connect with angle iron braces 81, and from preferably the upper end of these braces extends rearward (toward the vehicle C) a rod 82 pivoted to a lever 83 carried by the vehicle C and which may be held in a fixed position by a conventional latch 84 which may be carried by the steering wheel column of the vehicle. When so latched, the machine A is raised to an inoperative position but, when the lever 83 is released, the chopper will move downwardly to an operative position so that the ground wheels will roll over the ground upon movement of the vehicle C.

Referring to Figure 12, there will be seen a weeder attachment B, and a suitable number of which may be substituted for the knives 18, since it is provided with straps 90, like the straps 42 having axially aligned perforations to receive the shanks of bolts 91 provided with suitable nuts 92. The weeder attachments B are secured in place in a manner similar to that of the knives 18. As the weeders sweep across the machine A, they will catch weeds between the teeth 93 and toss them aside, roots and all.

Various changes in the shape, size and arrangements of parts may be made to the form of invention herein shown and described without departing from the spirit of the invention or the scope of the following claims.

We claim:

1. In a cotton chopper, a ground wheel having a hub and a rim; a shaft rotatably supporting said wheel; a hub-like member mounted upon said shaft; a spiral cam track; means rigidly securing said cam track to said hub-like member, with the axis of the spiral of said cam track substantially coincident with the axis of rotation of said wheel and with said cam track spaced from said wheel; a plurality of chopper knives; support means for said chopper knives, comprising a plurality of substantially T-shaped carriers, with a knife mounted upon one arm portion thereof, a roller mounted upon another arm portion thereof and constructed and arranged to roll over said cam track, a stop carried by the third arm portion of said carrier, a pivot for each carrier disposed at the junctures of said arms, bearings for each of the pivots, supported by said hub, and extending substantially parallel with the axis of rotation of said hub, said carriers supporting said knives to sweep in paths toward and away from said rim, and a retraction coil spring for each carrier extending from its carrier to said rim and connected to its carrier at a point intermediate the pivot and stop; abutments for said stops and carried by said wheel, each of said abutments being disposed at a distance spaced from the axis of rotation of said wheel substantially equal to the shortest distance the outer end of said cam track is spaced from said axis, and guide means for said ground wheel, including an elongated rigid member fixedly secured to said hub-like member.

2. In a cotton chopper, a ground wheel having a hub and a rim; a shaft rotatably supporting said wheel; a hub-like member mounted upon said shaft; a spiral cam track; means rigidly securing said cam track to said hub-like member, with the axis of the spiral of said cam track substantially coincident with the axis of rotation of said wheel and with said cam track spaced from said wheel; a plurality of chopper knives; support means for said chopper knives, comprising a plurality of substantially T-shaped carriers, with a knife mounted upon one arm portion thereof, a roller mounted upon another arm portion thereof and constructed and arranged to roll over said cam track, a stop carried by the third arm portion of said carrier, a pivot for each carrier disposed at the junctures of said arms, bearings for each of the pivots, supported by said hub, and extending substantially parallel with the axis of rotation of said hub, said carriers supporting said knives to sweep in paths toward and away from said rim, and a retraction coil spring for each carrier extending from its carrier to said rim and connected to its carrier at a point intermediate the pivot and stop; abutments for said stops and carried by said wheel, each of said abutments being disposed at a distance spaced from the axis of rotation of said wheel substantially equal to the shortest distance the outer end of said cam track is spaced from said axis, and the inner end of said cam track being spaced from said axis a distance to enable a roller of any of said rollers to mount said cam track after the completion of the sweep of a knife connected with the carrier upon which said roller is mounted, and guide means for said ground wheel, including an elongated rigid member fixedly secured to said hub-like member.

LUCIAN RILEY DABBS.
LAWRENCE RAY PALMER.

REFERENCES CITED

The following references are of record in the file of this patent:

UNITED STATES PATENTS

| Number | Name | Date |
|---|---|---|
| 697,028 | Shields | Apr. 8, 1902 |
| 871,035 | Head | Nov. 12, 1907 |
| 925,475 | Hood | June 22, 1909 |
| 1,211,971 | Siemann | Jan. 9, 1917 |
| 2,089,451 | Tolar | Aug. 10, 1937 |